(12) United States Patent
Brueck et al.

(10) Patent No.: US 12,399,120 B2
(45) Date of Patent: Aug. 26, 2025

(54) IN-LINE ANGULAR OPTICAL MULTI-POINT SCATTEROMETRY FOR NANOMANUFACTURING SYSTEMS

(71) Applicant: UNM RAINFOREST INNOVATIONS, Albuquerque, NM (US)

(72) Inventors: Steven R. J. Brueck, Albuquerque, NM (US); Alexander Neumann, Albuquerque, NM (US); Juan Jose Faria Briceno, Albuquerque, NM (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 0 days.

(21) Appl. No.: 17/773,115

(22) PCT Filed: Oct. 30, 2020

(86) PCT No.: PCT/US2020/058337
§ 371 (c)(1),
(2) Date: Apr. 29, 2022

(87) PCT Pub. No.: WO2021/087345
PCT Pub. Date: May 6, 2021

(65) Prior Publication Data
US 2024/0159669 A1    May 16, 2024

Related U.S. Application Data

(60) Provisional application No. 62/929,395, filed on Nov. 1, 2019.

(51) Int. Cl.
*G01N 21/47* (2006.01)

(52) U.S. Cl.
CPC ..... *G01N 21/47* (2013.01); *G01N 2021/4735* (2013.01); *G01N 2021/4792* (2013.01); *G01N 2201/105* (2013.01)

(58) Field of Classification Search
CPC ........ G01N 21/47; G01N 21/21; G01N 21/89; G01N 21/8901; G01N 21/896;
(Continued)

(56) References Cited

U.S. PATENT DOCUMENTS 4,668,860 A    5/1987 Anthon
4,904,877 A *  2/1990 Pietzsch ............... G01N 21/896
                                                250/559.49
(Continued)

FOREIGN PATENT DOCUMENTS

EP    1245922 A1    10/2002
JP    3631056 B2    3/2005
(Continued)

OTHER PUBLICATIONS

Search Report and Written Opinion dated Feb. 11, 2021 in corresponding International Application No. PCT/US2020/058337, 7 pages.
(Continued)

*Primary Examiner* — Michael A Lyons
(74) *Attorney, Agent, or Firm* — MH2 Technology Law Group LLP

(57) ABSTRACT

A method and system for high-speed 2Θ multi-point scatterometry is disclosed. The method includes directing a laser beam from a laser light source to a collimation optical system that collimates the laser beam to a collimated laser beam; adjusting a polarization of the collimated laser beam using a polarization control optics; directing the collimated laser beam that is polarized by a first optical system to illuminate a focal area on a sample surface; receiving
(Continued)

reflected light from the focus of the laser light source at the sample surface by a second optical system; detecting the reflected light by a detector system to produce detection signals; and processing the detection signals to measure parameters of the sample surface.

17 Claims, 10 Drawing Sheets

(58) Field of Classification Search
CPC ........... G01N 21/8983; G01N 21/9505; G01N 21/956; G01N 2021/4735; G01N 2021/4792; G01N 2021/4723; G01N 2201/105; G01N 2201/104; G01N 2201/06113; G01N 2201/0636; G06T 2207/30124; G01B 11/0691; G01B 11/02; G03F 7/70616; G03F 7/70625
USPC .............. 356/612, 369, 429–431, 445, 356/237.1–237.5, 238.1, 239.1; 250/559.16, 559, 45, 559.48, 559.49, 250/341.3
See application file for complete search history.

(56) References Cited

U.S. PATENT DOCUMENTS

| | | | |
|---|---|---|---|
| 4,931,657 A * | 6/1990 | Houston | G01N 21/94 356/369 |
| 4,966,457 A | 10/1990 | Hayano et al. | |
| 5,313,542 A | 5/1994 | Castonguay | |
| 5,859,424 A | 1/1999 | Norton et al. | |
| 6,075,612 A | 6/2000 | Mandella et al. | |
| 6,128,085 A | 10/2000 | Buermann et al. | |
| 6,128,093 A * | 10/2000 | Niikura | G01N 21/55 356/369 |
| 6,392,749 B1 | 5/2002 | Meeks et al. | |
| 6,429,943 B1 | 8/2002 | Opsal et al. | |
| 6,724,475 B2 | 4/2004 | Benesch et al. | |
| 6,774,991 B1 * | 8/2004 | Danko | G01N 21/95623 356/237.4 |
| 6,888,627 B2 | 5/2005 | Leslie et al. | |
| 7,184,145 B2 | 2/2007 | Amary et al. | |
| 7,292,341 B2 | 11/2007 | Brill et al. | |
| 7,327,457 B2 | 2/2008 | Hebert et al. | |
| 7,532,414 B2 | 5/2009 | Scheiner et al. | |
| 7,755,775 B1 | 7/2010 | Li | |
| 7,864,324 B2 * | 1/2011 | Shyu | G01N 21/4788 356/446 |
| 8,294,887 B1 | 10/2012 | Biellak et al. | |
| 8,319,966 B2 | 11/2012 | Zawaideh et al. | |
| 8,767,209 B2 | 7/2014 | Li et al. | |
| 9,170,156 B2 | 10/2015 | Li et al. | |
| 10,302,560 B2 | 5/2019 | Pruneri et al. | |
| 10,816,482 B2 | 10/2020 | Sreenivasan et al. | |
| 10,935,893 B2 | 3/2021 | Pandev et al. | |
| 11,073,768 B2 | 7/2021 | Hill et al. | |
| 11,162,897 B2 | 11/2021 | Antonelli et al. | |
| 11,327,012 B2 * | 5/2022 | Brueck | G01N 21/47 |
| 12,002,698 B2 | 6/2024 | Lee et al. | |
| 2002/0154311 A1 * | 10/2002 | Ivarsson | G01N 21/553 356/445 |
| 2007/0013912 A1 | 1/2007 | Ivarsson | |
| 2008/0049285 A1 * | 2/2008 | Pinard | B23K 26/0622 359/202.1 |
| 2012/0069326 A1 | 3/2012 | Colonna de Lega et al. | |
| 2013/0277553 A1 | 10/2013 | Otani et al. | |
| 2014/0375981 A1 | 12/2014 | Wang et al. | |
| 2016/0313658 A1 | 10/2016 | Marciano et al. | |
| 2016/0320319 A1 | 11/2016 | Hench et al. | |
| 2016/0327493 A1 * | 11/2016 | Sullivan | G02B 27/0944 |
| 2016/0341668 A1 | 11/2016 | Gupta et al. | |
| 2017/0045823 A1 | 2/2017 | Quintanilha | |
| 2019/0113335 A1 | 4/2019 | Satoyoshi | |
| 2019/0242978 A1 | 8/2019 | Weed et al. | |
| 2022/0317057 A1 * | 10/2022 | Faria Briceno | G01N 21/8901 |
| 2024/0159669 A1 | 5/2024 | Brueck et al. | |

FOREIGN PATENT DOCUMENTS

| | | |
|---|---|---|
| WO | 2004063698 A2 | 7/2004 |
| WO | 2016015734 A1 | 2/2016 |
| WO | 2021087345 A1 | 5/2021 |

OTHER PUBLICATIONS

Search Report and Written Opinion dated Aug. 22, 2019 in related PCT Application No. PCT/US2019/030943, 6 pages.
International Preliminary Report on Patentability dated Nov. 10, 2020 in related PCT Application No. PCT/ US2019/030943, 5 pages.
Zhu et al., "Scatterometry for Nanoimprint Lithography," J. Vac. Sci. Technol. B34, 06K503, (2016), 10 pages.

* cited by examiner

IN-LINE ANGULAR OPTICAL MULTI-POINT SCATTEROMETRY FOR NANOMANUFACTURING SYSTEMS

CROSS-REFERENCE TO RELATED APPLICATIONS

This application claims priority to provisional U.S. Provisional Application No. 62/929,395 filed on Nov. 1, 2019, the disclosure of which is hereby incorporated by reference in its entirety.

GOVERNMENT RIGHTS

This application is a U.S. National Phase application of PCT/US2020/058337 filed Oct. 30, 2020, which claims priority to U.S. Provisional Application No. 62/929,395 filed on Nov. 1, 2019, the entireties of all of which are incorporated herein by reference.

FIELD

The present teachings generally relate to In-line Angular Optical Multi-point Scatterometry for Nanomanufacturing Systems.

BACKGROUND

There is increasing interest in high volume manufacturing of small scale (micrometer to nanometer) using various roll-to-roll (R2R) manufacturing techniques. The scale of these structures today is at the micrometer scale or larger, but opportunities are appearing for nanoscale structures such as wire-grid polarizers and metal-mesh conductors to replace difficult to obtain materials used today for transparent electrodes such as indium-tin-oxide (ITO). Many thin-film processes are also on interest for a variety of applications such as optical coating, battery materials, solar cells and high-T c superconducting tapes. These applications could benefit from real-time measurements such as scatterometry, reflectometry and ellipsometry.

The integrated circuit industry has been manufacturing products at nm scales for many years. IC manufacturers use wafer-scale manufacturing with a very well developed and robust tool set, work on a stable substrate (Si) and use statistical process control to monitor a relatively small sampling of product for metrology purposes. In contrast the R2R manufacturing is an emerging industry where the tools are in an early stage of maturity, the substrate necessarily is flexible and, therefore, stretchable, and the dynamic processes add vibrations and fluidic disturbances. As a result, there is a need for real-time metrology that can scan multiple points across a sample surface with microscale or nanoscale structures, such as a web, and provide feedforward/feedback information for the manufacturing process.

Scatterometry, the measurement of light reflected/transmitted/scattered from a sample with a nanoscale structured array has a long history of providing metrological information. Scatterometry is a noncontact, nondestructive far-field optical technique that satisfies many of the metrology requirements. Sensitivity to nanoscale feature dimensions has been demonstrated. Two directions in scatterometry have been investigated: 1) ellipsometric scatterometry where the complex polarization response (Mueller matrix) is measured as a function of wavelength of the incident light using a broadband incoherent source; and 2) angular scatterometry where the angle of incidence is varied at a fixed wavelength using a laser source. Each has advantages: ellipsometric scatterometry has greater sensitivity, but a) requires a more detailed knowledge and control of the properties of all of the involved materials as a function of wavelength and b) requires a long measurement time because of restrictions on optical power density imposed by an extended, incoherent source. [Arie J. den Boef, *Optical wafer metrology sensors for process-robust CD and overlay control in semiconductor device manufacturing*, Surf. Topogr.: Metrol. Prop. 4, 023001 (2016)] Angular scatterometry has a potential for a faster response since it uses a much brighter [power/(wavelength-cm$^2$-solid-angle)] coherent laser source that can be focused to small dimensions as needed by metrology targets and offers much higher power densities, allowing larger bandwidth receivers to accommodate higher speeds. Additionally, angular scatterometry only requires knowledge of the optical properties at a single wavelength, usually well removed from spectral regions of high material variability, which makes the interpretation of the scattering signature vs. angle more reliable.

More generally, reflectometry (the measurement of the reflection coefficient of a sample surface as a function of angle of incidence and wavelength) and ellipsometry (the measurement of the polarization/depolarization properties of reflection/transmission through a film film stack) are being used for a variety of metrological purposes.

2θ scatterometry, a noncontact optical measurement of the reflectivity of a structured pattern on a wafer, has demonstrated the necessary resolution for 3D structures. However most instruments operate as off-line tools with measurement times and sample preparation requirements that are incompatible with manufacturing process control needs.

We have previously disclosed (provisional patent application 62/688,003 filed May 7, 2018; provisional patent application 62/776,640 filed Dec. 7, 2018 and PCT application PCT/US19/30943 filed May 6, 2019) a single point dynamical scatterometry system for real time monitoring of nanoscale structures during R2R manufacturing. In this system, the entire metrology module was scanned across the web to provide across the web information. This, of course, precluded monitoring multiple spots across the web in real time.

SUMMARY

In accordance with examples of the present disclosure, a method for high-speed 2θ multi-point scatterometry is disclosed. The method comprises collimating a laser beam from a laser light source; adjusting a polarization of the collimated laser beam using a polarization control optics; directing the collimated laser beam that is polarized by a first optical system to illuminate a focal area on a sample surface at a dynamically variable angle of incidence; receiving reflected light from the sample surface at the focus of the laser light source by a second optical system; detecting the reflected light by a detector system to produce detection signals; and processing the detection signals to measure parameters of the sample surface.

In accordance with examples of the present disclosure, a system for high-speed 2θ multi-point scatterometry is disclosed. The system comprises a collimation optics that collimates a laser beam into a collimated laser beam from a laser light source; a polarization control optics that polarizes the collimated laser beam to produce a polarized collimated laser beam; a first optical system that receives the polarized collimated laser beam that projects a one-dimensional focus of the laser light source onto a sample surface containing a nanoscale structure array; a second optical system that receives reflected light from the one-dimensional focus at the sample surface; a detection system that detects the reflected light to produce detection signals; and a processing system that processes the detection signals to measure a parameter of the sample surface.

Various additional features can be included in the method and the system including one or more of the following. In some examples the first optical system results in a two dimensional focus at the sample surface. In some examples, the first optical system results in a one-dimensional (line) focus at the sample surface. The first optical system includes a optomechanical element to dynamically vary an angle of incidence of the illumination forming the focus at the sample surface. The method further comprises translating the first optical system and the second optical system across the sample surface to cover additional regions of the sample surface. The method further comprises projecting a one-dimensional focal image of the laser light source onto the sample surface with a dynamically variable angle of incidence by using two resonant scanners and one or more one-dimensional parabolic mirrors. The method further comprises projecting a one-dimensional focal image of the laser light source onto the sample surface with a dynamically variable angle of incidence by using two resonant scanners and one or more acylindrical lenses. The method further comprises creating a one-dimensional focal image of the laser light source using a grating to create multiple diffraction orders along a line; and using a resonant scanner and parabolic mirrors to dynamically vary angles of incidence and collection of a multiplicity of foci of different diffraction orders onto the sample surface. The method further comprises creating a one-dimensional focal image of the laser light source using a grating to create multiple diffraction orders along a line; and using a resonant scanner and acylindrical lenses to dynamically vary angles of incidence and collection of a multiplicity of diffraction orders onto the sample surface. The method further comprises creating a one-dimensional focal image of the laser light source using an optical system to expand the laser beam from the laser light source in one direction, and using a resonant scanner along with parabolic mirrors to dynamically vary angles of incidence and collection of the illumination forming the focus of the laser beam that is expanded from the laser light source onto the sample surface. The method further comprises creating a one-dimensional focal image of the laser light source using an optical system to expand the laser beam from the laser light source in one direction, and using a resonant scanner along with acylindrical mirrors to dynamically vary angles of incidence and collection of the illumination forming the focus of the laser beam that is expanded from the laser light source onto the sample surface.

The method further comprises projecting a multiplicity of focal images of the laser light source onto the sample surface with a dynamically variable angle of incidence by using a multiple leg optical system with a resonant scanner and a pair of parabolic mirrors for each leg of the multiple leg optical system. Each leg of the multiple leg optical system can be rotated on an axis perpendicular to a direction of sample surface motion to allow for conical diffraction measurements. The processing the detection signals comprising averaging the detection signals from multiple repetitions of mechanical motion. The method further comprises recording the detection signals. Each of the two resonant scanners can be a galvanometric mirror scanner. The one resonant scanner is a galvanometric mirror scanner. The resonant scanner is a galvanometric mirror scanner. The laser light source is a single diode laser. Alternatively, the laser light source can be formed from multiple laser beams multiplexed onto a single path. The first optical system comprises a first resonant scanner or a patterned grating that creates multiple laser beams from the laser beam emitted by the laser source, a second resonant scanner, and a one-dimensional parabolic mirror. The laser beam is scanned in first dimension using a first resonant scanner and scanned in a second dimension using a second resonant scanner. The detector system comprises a single detector. An alternative first optical system comprises a resonant scanner, a patterned grating that creates multiple laser beams from the laser beam, and a one-dimensional parabolic mirror. The detector system comprises a number of independent detectors that match a number of multiple laser beams. In yet another embodiment, the first optical system comprises a plurality of resonant scanners and a plurality of one-dimensional parabolic mirrors, wherein each resonant scanner of the plurality of resonant scanners is associated with a one-dimensional parabolic mirror of the plurality of parabolic mirrors.

In accordance with examples of the present disclosure, a method for high-speed 2θ multi-point scatterometry is disclosed. The method comprises providing a laser light source; providing collimation and polarization control optics for the laser light source; providing an optical system configured to project a multiplicity of focal line images of the light source onto a sample surface with a dynamically variable angle of incidence by using two resonant scanners and 1 dimensional parabolic mirrors; and processing data by signal averaging and recording.

Various additional features can include one or more of the following. The entire optical system can be translated across the nanoscale structure to cover additional regions of the nanoscale structure.

In accordance with examples of the present disclosure, a method for high-speed 2θ multi-point scatterometry is disclosed. The method comprises providing a laser light source; providing collimation and polarization control optics for the laser light source; providing an optical system configured to project a multiplicity of focal line images of the light source onto a sample surface with a dynamically variable angle of incidence by using one resonant scanner, using diffraction orders, and 1 dimensional parabolic mirrors; and processing data by signal averaging and recording.

Various additional features can include one or more of the following. The entire optical system can be translated across the nanoscale structure to cover additional regions of the nanoscale structure.

In accordance with examples of the present disclosure, a method for high-speed 2θ multi-point scatterometry is disclosed. The method comprises providing a laser light source; providing collimation and polarization control optics for the laser light source; providing an optical system configured to project a multiplicity of focal spots of the light source onto a sample surface with a dynamically variable angle of incidence by using multi-leg system with a resonant scanner, and parabolic mirror in each leg; and processing data by signal averaging and recording.

Various additional features can include one or more of the following. The entire optical system can be translated across the nanoscale structure to apply metrology to additional regions of the nanoscale structure and rotated on an axis perpendicular to the direction of nanoscale structure motion to allow conical diffraction measurements.

In accordance with examples of the present disclosure, a multi-point angular scatterometer is disclosed. The scatterometer comprises a laser light source; control optics configured to provide collimation and polarization of the laser light source; an optical system comprising two resonant scanners and 1 dimensional parabolic mirrors configured to project a multiplicity of focal line images of the light source onto a sample surface with a dynamically variable angle of incidence; and a data collection system configured for signal averaging and recording.

In accordance with examples of the present disclosure, a multi-point angular scatterometer is disclosed. The scatterometer comprises a laser light source; control optics configured to provide collimation and polarization of the laser light source; an optical system comprising one resonant scanner and 1 dimensional parabolic mirrors configured to project a multiplicity of focal line images of the laser light source onto a sample surface with a dynamically variable angle of incidence; and a data collection system configured for signal averaging and recording.

In accordance with examples of the present disclosure, a multi-point angular scatterometer is disclosed. The scatterometer comprises a laser light source; control optics configured to provide collimation and polarization of the laser light source; an optical system comprising a multi-leg system wherein each leg includes a resonant scanner and 1 dimensional parabolic mirrors configured to project a multiplicity of focal spots of the laser light source onto a sample surface with a dynamically variable angle of incidence; and a data collection system configured for signal averaging and recording.

DETAILED DESCRIPTION

In accordance with examples of the present disclosure, a multipoint angular in-line scatterometer is described, which monitors the reflectivity from a sample surface containing a periodic microscale and nanoscale structure array. Most often this is applicable to micro- and nanoscale structures that are smaller than the resolution limits of traditional optical microscopy. A constraint is that the illuminated spot on the sample should be much larger in linear dimension that the period of the structure array.

Described herein are a plurality of examples of a multi-point angular in-line scatterometer including the following: using dual resonant scanners along with 1-dimensional parabolic mirrors; using dual resonant scanners along with 1-dimensional acylindrical lenses; using one resonant scanner and optics to broaden the light beam in the dimension perpendicular to the scan direction to allow measurement of the reflectivity from multiple points, along with 1-dimensional parabolic mirrors; using one resonant scanner and optics to broaden the light beam in the dimension perpendicular to the scan direction to allow measurement of the reflectivity from multiple points; and along with 1-dimensional acylindrical lenses, and a multi-point inspection system using a multiplicity of parabolic mirrors or acylindrical lenses disposed on a line that is tilted relative to the direction of web motion. In the examples shown in FIGS. 1-7, the various optical elements are shown for simplicity without their respective optical mount. As described herein, the one or more of the optical elements can move in one or more degrees of freedom depending on the configurations of FIGS. 1-7.

Figure 1:
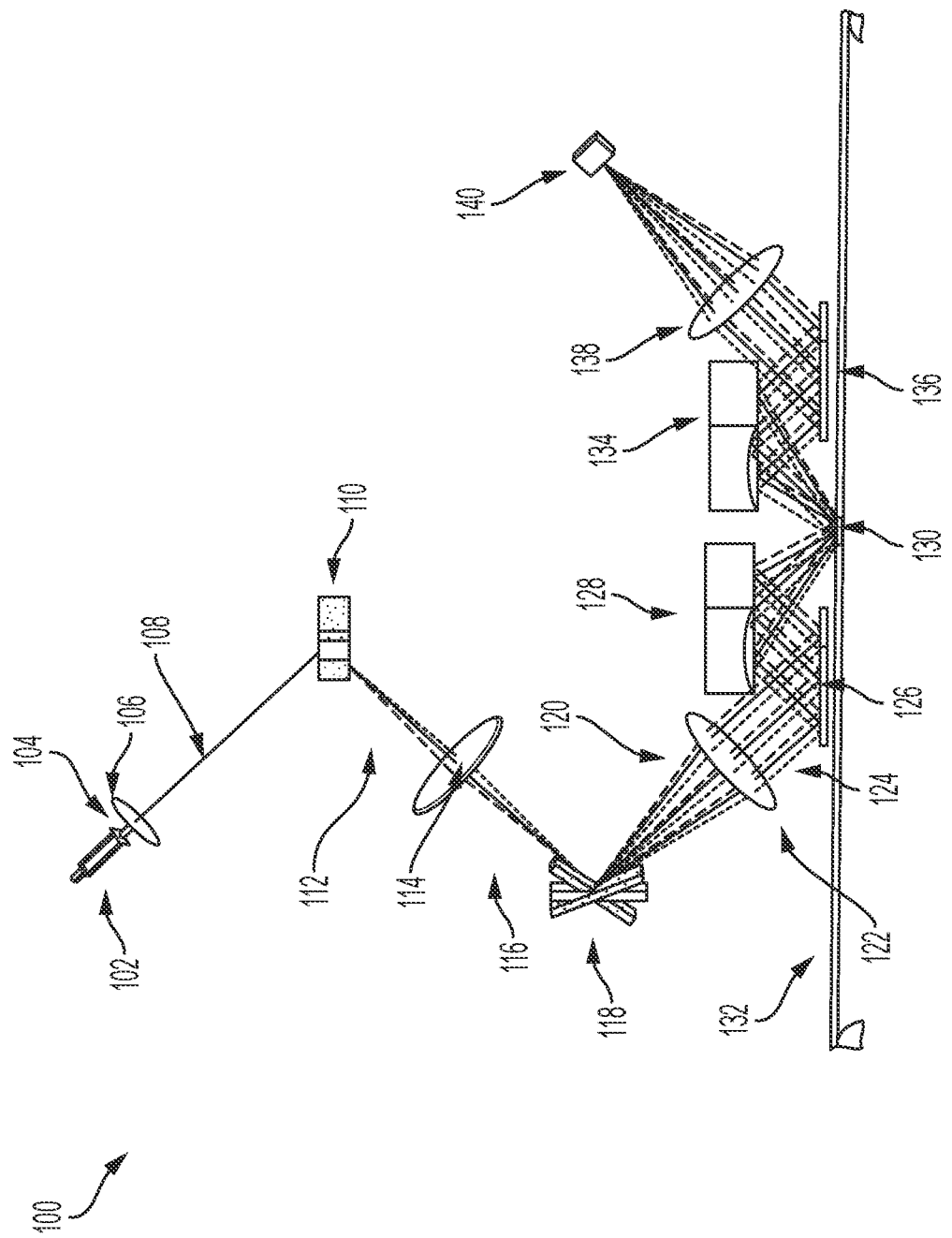
FIG. 1 shows a side view of the dual resonant scanner system with a pair of parabolic mirrors to extract multi-point experimental data from a nanoscale structure array in accordance with the present teachings.
Figure 2:
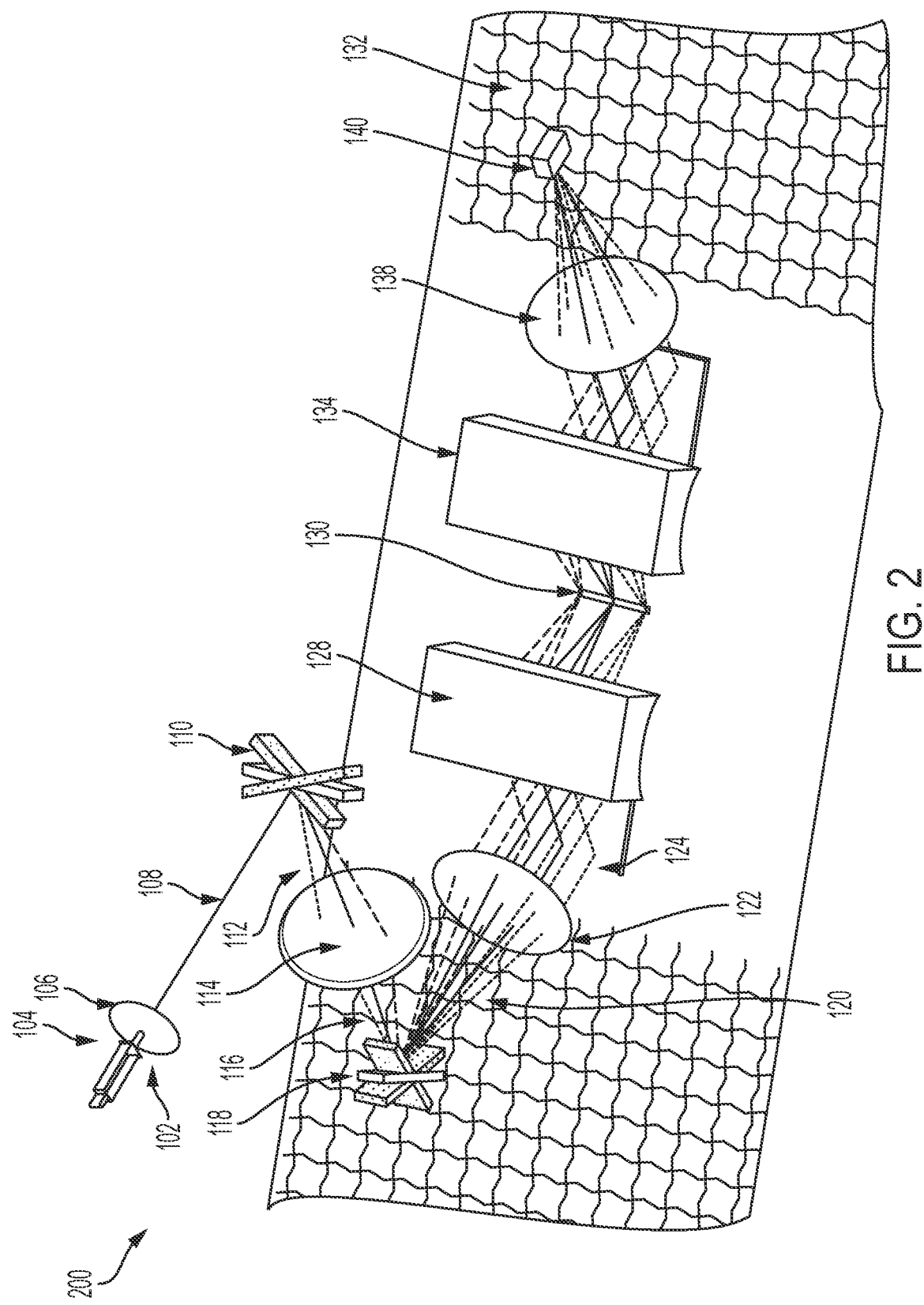
FIG. 2 shows a top view of the dual resonant scanner system to extract multi-point experimental data from a moving nanoscale structure in accordance with the present teachings. Each image on the nanoscale structure is a line image (~1 mm wide, corresponding to the collimated laser size) with a varying angle of incidence.

FIG. 1 and FIG. 2 show a side view and top view, respectively, of multipoint scatterometry system based on two resonant scanners with parabolic mirrors according to examples of the present disclosure. In the multi-point scatterometry system FIG. 1 and FIG. 2, the dual resonant scanner uses dual resonant scanners and 1-dimensional parabolic mirrors to scan a ray of points across a sample surface, such as a moving web. Each image on the sample surface, i.e., web, is a line image (about several mm wide, corresponding to the collimated laser size) with a varying angle of incidence.

The first multi-point inspection system design comprises using two resonant scanners to scan the beam in 2 directions across the web. The orientations of the two scanners are perpendicular from each other to allow scanning on both directions across the web. The scanner that moves the beam in the cross web direction will be slower than the scanner that varies the incident angle (angle scan direction). The 1-dimensional parabolic mirrors will be 90° off-axis. The angular range of the system will depend on the curvature of the parabolic mirrors. The long-dash, solid, and short-dash traces indicate the extent of the angular scan at different cross-web positions. As a result of the 1-dimensional optics, the spot on the sample in the cross-web direction will be approximately the same size as the collimated beam, while it will be focused to a smaller spot in the along-web direction.

As shown in FIG. 1 and FIG. 2, laser 102, such as a 405 nm laser, produces laser beam 104, incident onto polarizer 106, which produces polarized laser beam 108. Polarized laser beam 108 is incident onto first resonant scanner 110, such as a first galvanometric mirror scanner that oscillates at a first defined frequency, to produce first laser beam 112 that is swept in a first direction and is then incident onto first focusing lens 114. Focused laser beam 116 is then incident onto second resonant scanner 118, such as a second galvanometric mirror scanner that oscillates at a second defined frequency, that produces a second laser beam 120 that is swept in a second direction and is collimated by collimating lens 122 to produce collimated laser beam 124. Collimated laser beam 124 is incident on first mirror 126 that reflects collimated laser beam 124 to first one-dimensional parabolic mirror 128, which focus the laser beam to target area 130 of nanoscale structure 132. The laser beam that is reflected from target area 130 is received by second one-dimensional parabolic mirror 134 and second mirror 136. The laser beam reflected by second mirror 136 is then incident on second focusing lens 138, which focuses the laser beam that is received by detector 140. For ease of representation, lenses 114, 122, and 138 are shown as simple spherical lenses; depending on the width of the web, more complex optical arrangements may be required and are incorporated herein.

The advantages of the system of FIG. 1 and FIG. 2 include the use of continuous ray of points that are scanned during the fabrication process on a moving sample surface and the angular scan across the sample surface can be easily expanded by decreasing the frequency of the first resonator allowing large scanning area across the web. The disadvantages of the system of FIG. 1 and FIG. 2 include monitoring corresponding to a line at an angle to the direction of web motion at high sample surface movement; the 1 dimensional parabolic mirrors will be large and custom-made which translates to more expensive optical components; the system requires using flat mirrors 126 and 136 close to the web, clearance from the sample surface which may be an issue; and since each point is monitored sequentially, the system is not fully real-time.

Figure 3:
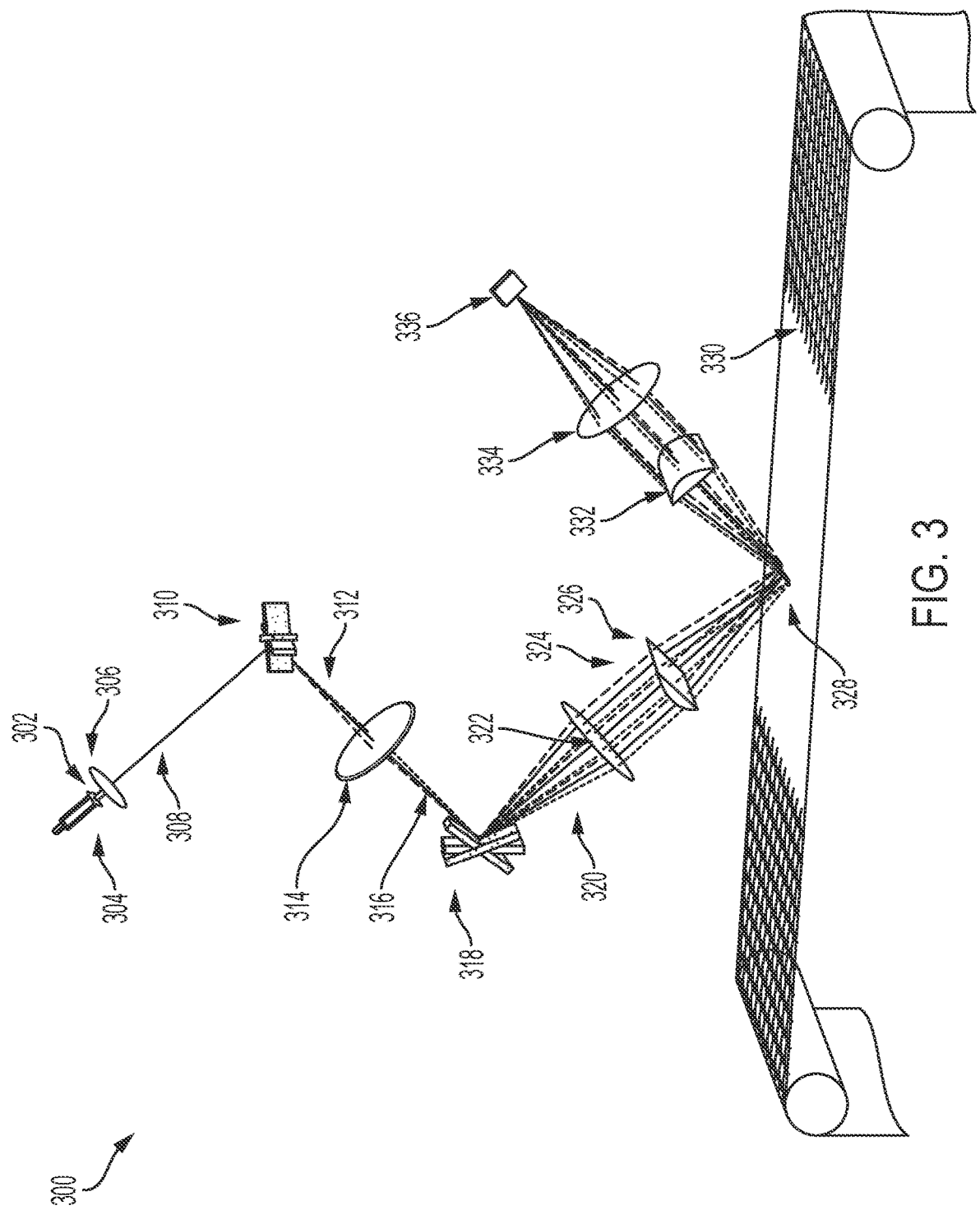
FIG. 3 shows a side view of the multi-point angular scatterometer with a dual resonant scanners and acylindrical lenses in accordance with the present teachings.

FIG. 3 shows an alternative design of the system of FIG. 1 and FIG. 2 using acylindrical lenses. FIG. 3 shows a top view 300 of the dual resonant scanner system to extract multi-point experimental data from a moving nanoscale structure using acylindrical lenses according to examples of the present disclosure. The cylindrical counterpart, as shown in FIG. 1 and FIG. 2, to an aspheric lens, as shown in FIG. 3, that improves the optical performance at large NA as compared with a simple cylindrical surface. Each image on the nanoscale structure is a line image (~1 mm wide, corresponding to the collimated laser size) with a varying angle of incidence. The advantage of using acylindrical lenses is to reduce the number of optical parts; however, acylindrical lenses result in more optical aberrations than the parabolic mirrors. The NA of the acylindrical lenses determines the angle scan range. An advantage of the optical system of FIG. 3 compared with the system of FIG. 1 and FIG. 2 is that it eliminates the flat mirrors adjacent to the web. On the other hand, it is likely more restricted in the NA of the optical system and hence the angular range of the measurement.

As shown in FIG. 3, laser 302, such as a 405 nm laser, produces laser beam 304 that is incident onto polarizer 306, which produces polarized laser beam 308. Polarized laser beam 308 is incident onto first resonant scanner 310, such as a first galvanometric mirror scanner that oscillates at a first defined frequency, to produce first laser beam 312 that is swept in a first direction and is then incident onto first focusing lens 314. Focused laser beam 316 is then incident onto second resonant scanner 318, such as a second galvanometric mirror scanner that oscillates at a second defined frequency, that produces a second laser beam 320 that is swept in a second direction and is collimated by collimating lens 322 to produce collimated laser beam 324. Collimated laser beam 324 is incident on first acylindrical lens 326, which focus the laser beam to target area 328 of nanoscale structure 330. The laser beam that is reflected from target area 328 is received by second acylindrical lens 332 and focused by second focusing lens 334, which focus the laser beam to be received by detector 336.

Figure 4:
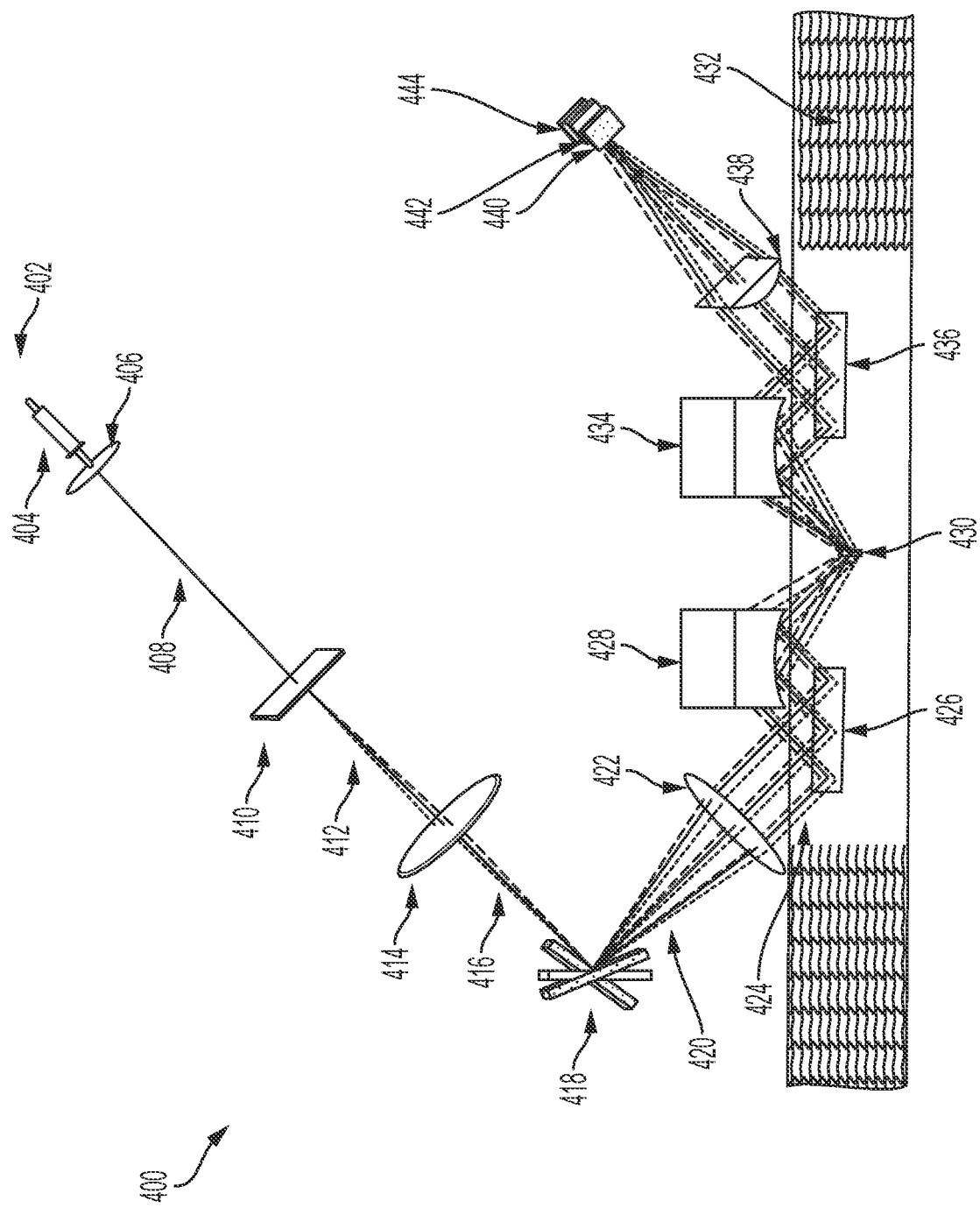
FIG. 4 shows a side view of the multi-point angular scatterometer with one resonant scanner, one patterned structure, 1 dimensional parabolic mirrors, and a detector array in accordance with the present teachings.
Figure 5:
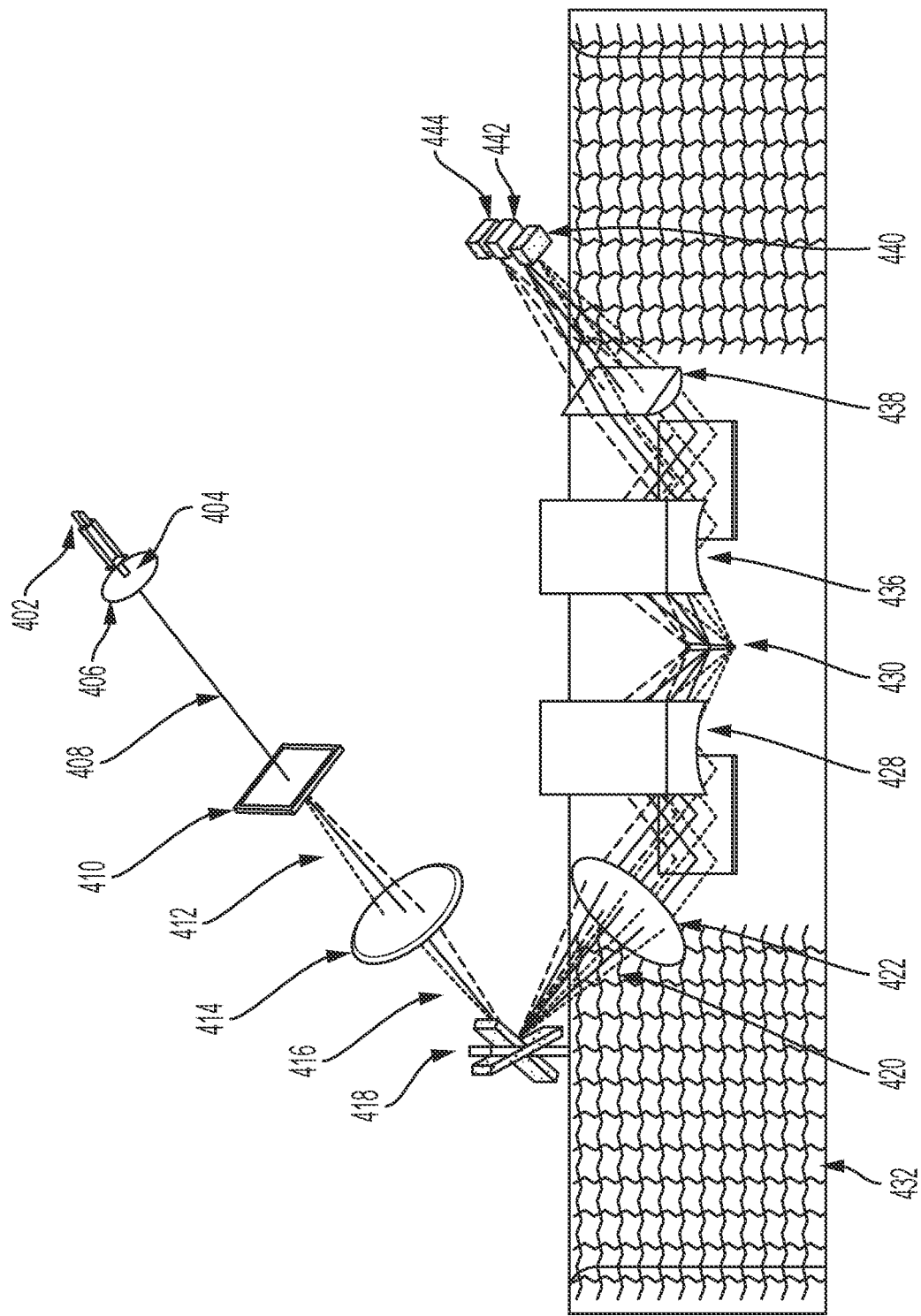
FIG. 5 shows a top view of the multi-point angular scatterometer with one resonant scanner, one patterned structure, 1 dimensional parabolic mirrors, and a detector array in accordance with the present teachings.

FIG. 4 and FIG. 5 show a side view 300 and a top view 400, respectively, of the multi-point angular scatterometer with a single resonant scanner, 1 dimensional beam expanding optics, and parabolic mirrors, according to an example of the present disclosure. The third embodiment uses a single resonant scanner and optics for expanding the illumination beam in the direction orthogonal to the scan direction. FIG. 4 (side view) and FIG. 5 (top view) present the multi-point scatterometer using one resonator, beam broadening optics, and 1 dimensional parabolic mirrors. Possibilities for the beam broadening include a diffraction grating to create a number of orders and a cylindrical lens optical system to expand the beam in one dimension. One such optical system includes a negative cylindrical lens to expand the beam followed by a positive cylindrical lens to recollimate the beam. Other related systems are well known in the art and may be used depending on the specifics of the installation. A spherical lens will be used to focus all of the collected diffraction orders on the resonant scanner mirror. The resonant scanner movement will be perpendicular to the direction of the expanded beam. The 1 dimensional parabolic mirror focuses the multiple diffracted orders or the collimated beam to the moving web and reflected light from the periodic structure array is collected by a second parabolic mirror and directed by additional optics to detector array that span across the web. In the case of the diffraction grating beam splitter, it may be necessary to translate the entire system to cover all of the transverse positions of the web.

As shown in FIG. 4 and FIG. 5, laser 402, such as a 405 nm laser, produces laser beam 404 that is incident onto polarizer 406, which produces polarized laser beam 408. Polarized laser beam 408 is incident onto pattern structure 410, such as a diffraction grating that that produces a laser beam with number of diffraction orders 412 and is then incident onto first focusing lens 414. Focused laser beam 416 is then incident onto resonant scanner 418, such as a galvanometric mirror scanner oscillating at a defined frequency that produces scanned laser beam 420 that is swept in a direction and is collimated by collimating lens 422 to produce collimated laser beam 424. Collimated laser beam 424 is incident on first mirror 426 that reflects collimated laser beam 424 to first one-dimensional parabolic mirror 428, which focus the laser beam to target area 430 of nanoscale structure 432. The laser beam that is reflected from target area 430 is received by second one-dimensional parabolic mirror 434 and second mirror 436. The laser beam reflected by second mirror 436 is then incident on second focusing lens 438, which focus the laser beam to be received by separate detectors 440, 442, and 444. Each detector 440, 442, and 440 receives a different diffraction order from the laser beam.

The advantages of the system of FIG. 4 and FIG. 5 include a dense array of line segments scanned during the fabrication process on a moving web and the scanned line segments at the web are processed simultaneously allowing realtime monitoring in the cross-web direction. The disadvantages of the system of FIG. 4 and FIG. 5 include the number of points scanned on at the web is dependent on the number of diffraction orders and the system will require using flat mirrors close to the web. The use of a cylindrical optical system addresses the number of points at the expense of a reduced intensity for each location across the web.

Figure 6:
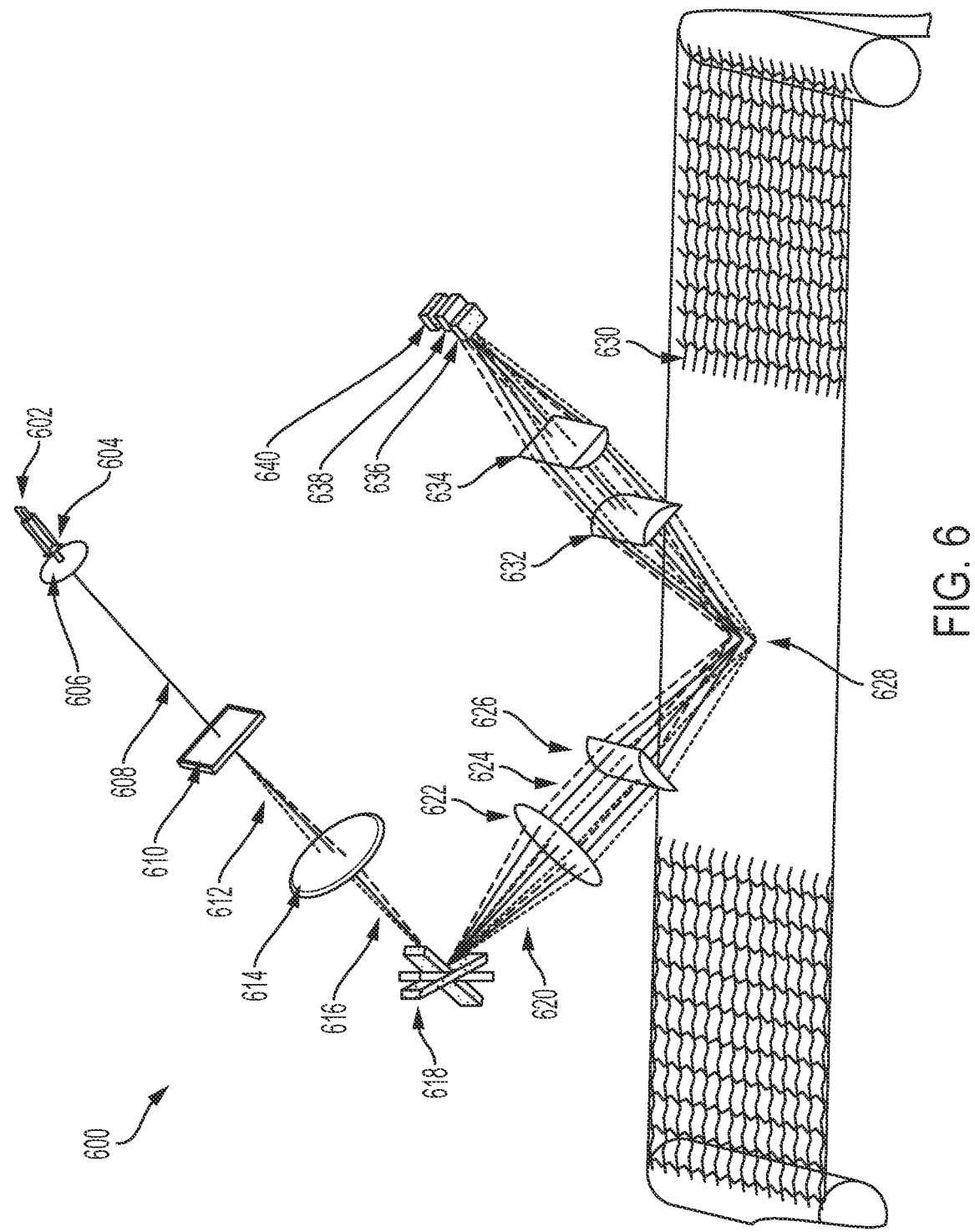
FIG. 6 shows a side view of a multi-point scattometer with one patterned structure, one resonant scanner, acylindrical lenses, and a detector array in accordance with the present teachings.

FIG. 6 shows a top view 600 of the multi-point angular scatterometer with one resonant scanner, one patterned structure, and acylindrical lenses according to examples of the present disclosure. The system of FIG. 6 is similar to the system of FIG. 4 and FIG. 5 with the parabolic mirrors replaced with acylindrical lenses. This simplifies the optical system and eliminates the flat mirrors close to the sample surface.

As shown in FIG. 6, laser 602, such as a 405 nm laser, produces laser beam 604, that is incident onto polarizer 606, which produces polarized laser beam 608. Polarized laser beam 608 is incident onto pattern structure 610, such as a diffraction grating that that produces a laser beam with number of diffraction orders 612 and is then incident onto first focusing lens 614. Focused laser beam 616 is then incident onto resonant scanner 618, such as a galvanometric mirror scanner that oscillating at a defined frequency that produces scanned laser beam 620 that is swept in a direction and is collimated by collimating lens 622 to produce collimated laser beam 624. Collimated laser beam 624 is incident on first acylindrical lens 626, which focus the laser beam to target area 628 of nanoscale structure 630. The laser beam that is reflected from target area 628 is received by second acylindrical lens 632 and focused by second focusing lens 634, which focus the laser beam to be received by separate detectors 636, 638, and 640. Each detector 636, 638, and 640 receives a different diffraction order from the laser beam.

Figure 7:
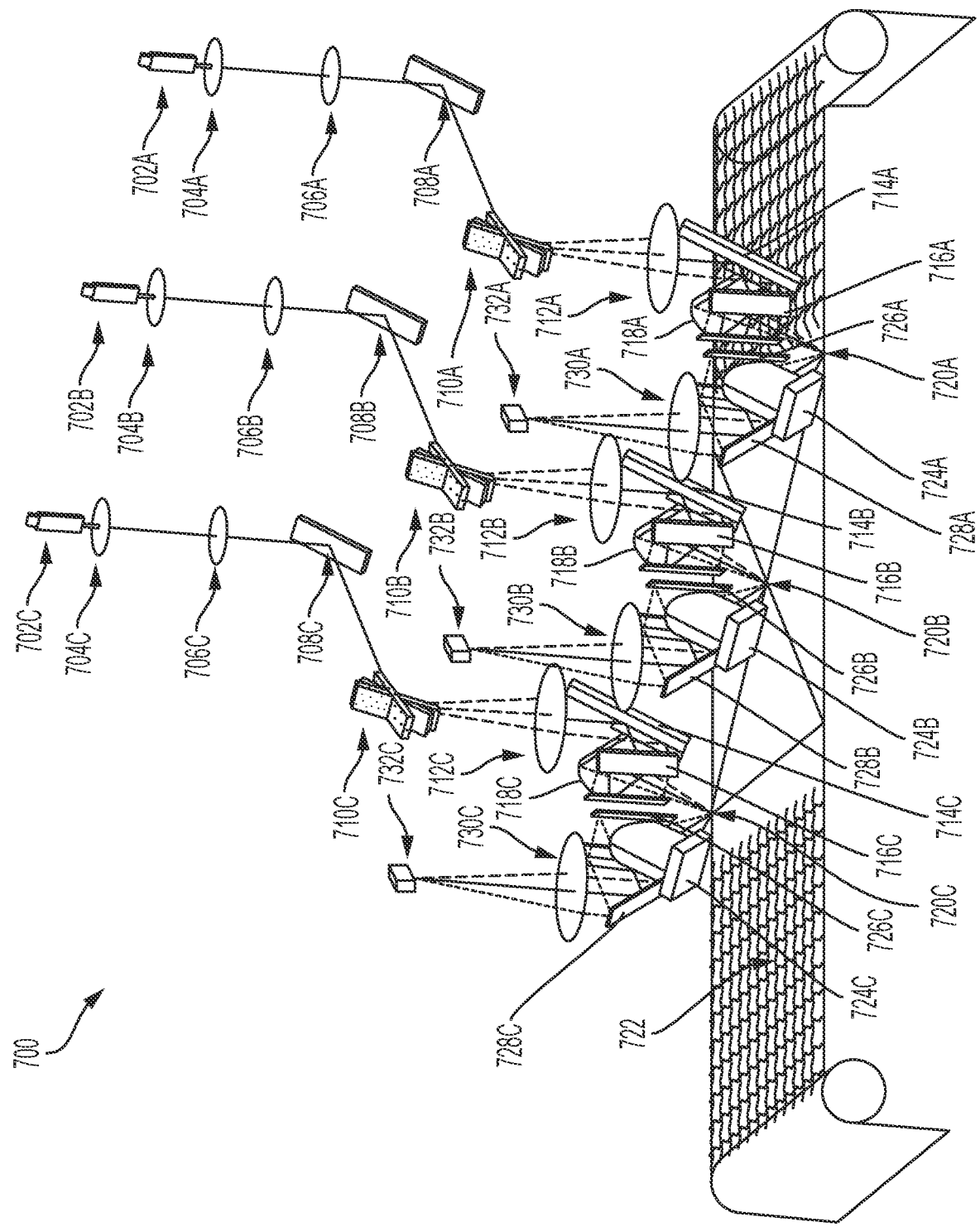
FIG. 7 shows a side view #1 of a multi-point scatterometer with individual single point scatterometers disposed along a diagonal across the web in accordance with the present teachings. The orientation of each single point scatterometer can be adjusted to provide either on-axis or conical scatterometry measurements.

FIG. 7 shows a side view of a multi-point scatterometer comprising a multiplicity of single-point scatterometers oriented diagonally to the cross web direction to allow space for the optical components at 45° according to examples of the present disclosure. Each individual optical system can be rotated so that the light is incident at an arbitrary direction relative to the direction of web motion. The advantages of the system of FIG. 7 include the following: continuous ray of points scanned during the fabrication process on a moving web, the systems scanned points can be processed simultaneously, the system uses 45° off-axis parabolic mirrors reducing space limitation and clearance problems with the moving web, and each individual point system can be rotated to have the angular scan direction at an arbitrary direction relative to the direction of web motion. The disadvantages of the system of FIG. 7 include the system may require many of optical components which will increase the cost and the system will occupy more space in the along-web direction.

As shown in FIG. 7, a laser with appropriate beam splitting optics or a plurality of lasers, as shown for simplicity 702A, 702B, 702C, such as a 405 nm laser, produces laser beams, respectively, that are incident onto respective first focusing elements 704A, 704B, 704C and respective polarizers 706A, 706B, 706C, which produces polarized laser beams, respectively. Polarized laser beams are incident onto respective flat mirror 708A, 708B, 708C and are then incident on respective resonant scanners 710A, 710B, 710C, such as a galvanometric mirror scanner that oscillates at a defined frequency, that produces scanned laser beams that are swept in a direction and are collimated by respective collimating lenses 712A, 712B, 712C to produce respective collimated laser beams. Collimated laser beams are then incident on respective first set of flat mirrors 714A, 714B, 714C and 716A, 716B, 716C, which directs the laser beam to respective first parabolic mirrors 718A, 718B, 718C and then onto respective target areas 720A, 720B, 720C of nanoscale structure 722. The laser beam that is reflected from respective target areas 720A, 720B, 720C are received by second set of parabolic mirrors 724A, 724B, 724C and respective second flat mirrors 726A, 726B, 726C and 728A, 728B, 728C focused by second focusing element 730A, 730B, 730C, which focus the respective laser beams to be received by separate detectors 732A, 732B, 732C.

The choice of the angle relative to the web motion will depend on the details of the structure. It will be straightforward to rotate the entire system so that the line between the beams is at an arbitrary orientation with respect to the web direction. Additionally, each system can be rotated to control the direction of the angular sweep relative to the direction of web motion.

For each embodiment, additional components such as splitters to monitor the laser power are included by reference but are not explicitly shown above.

Figure 8:
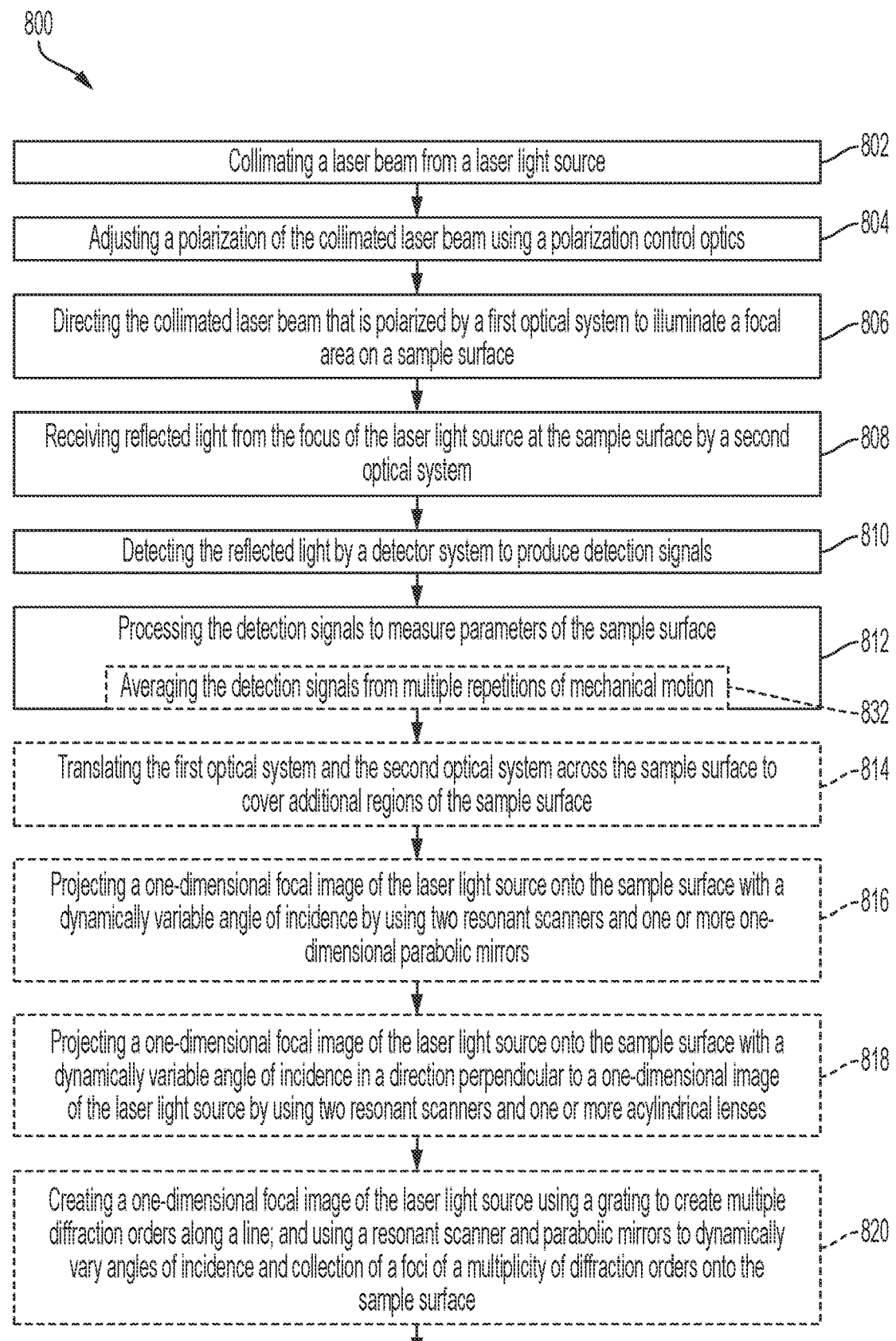
FIG. 8 shows a step sequence incorporating the essential features of the scatterometry measurement in accordance with the present teachings.
Figure 8:
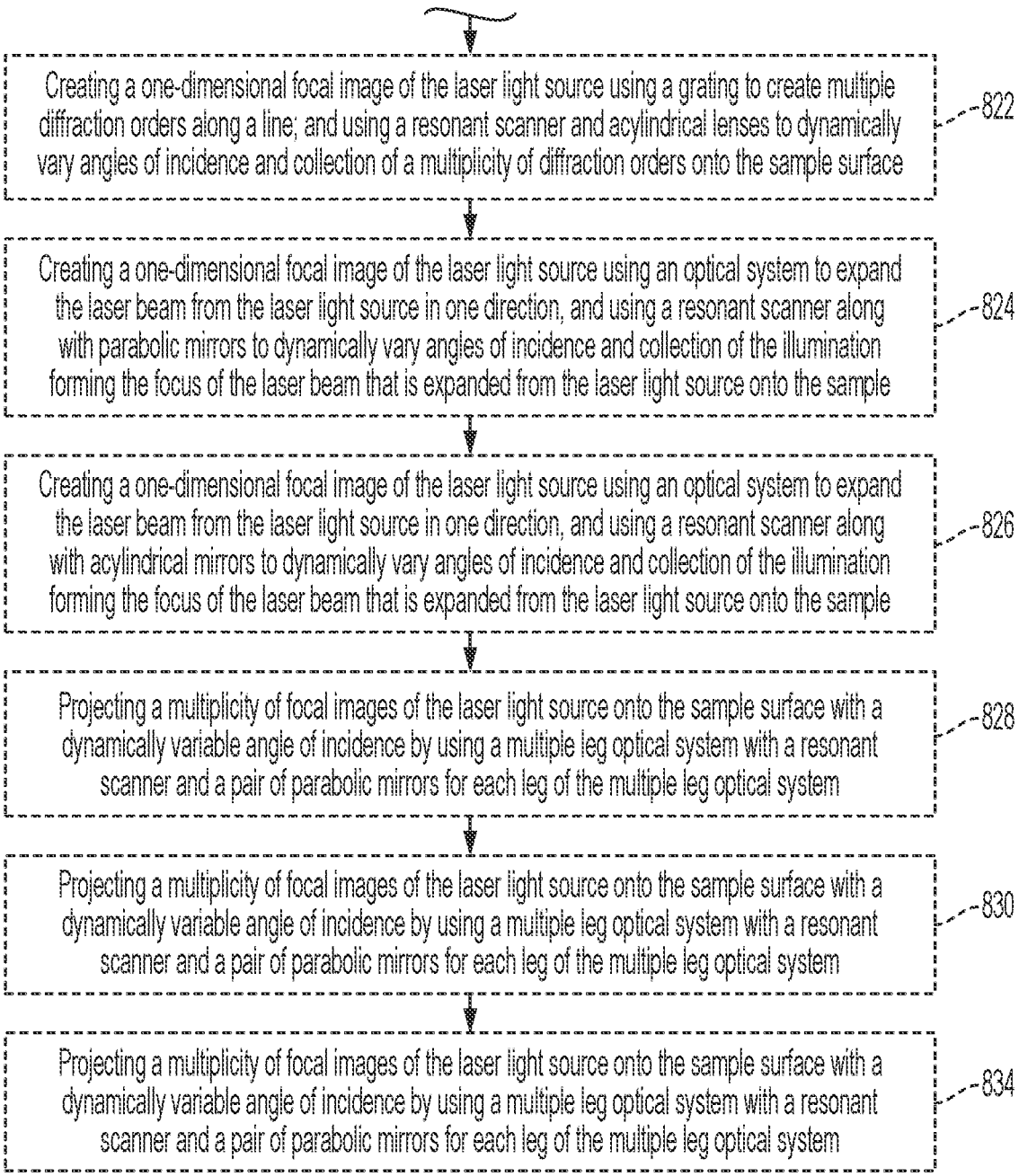

FIG. 8 shows a method 800 for high-speed 2θ multi-point scatterometry according to examples of the present disclosure. The method 800 comprises collimating a laser beam from a laser light source, as in 802. In some examples, the laser light source is a single diode laser. In some examples, the single diode laser can be split into multiple laser beams using one or more beam dividing optics. In some examples, the laser light source is a plurality of diode lasers. As shown in the example of FIG. 1 and FIG. 2, laser beam from 104 from laser 102 is collimated by collimating lens 122 to produce collimated laser beam 124. As shown in the example of FIG. 3, laser beam 308 from laser 304 is collimated by collimating lens 322 to produce collimated laser beam 324. As shown in the examples of FIGS. 4 and 5, laser beam 404 from laser 402 is collimated by collimating lens 422 to produce collimated laser beam 424. As shown in the example of FIG. 6, laser beam 604 from laser 602 is collimated by collimating lens 622 to produce collimated laser beam 624. As shown in the example of FIG. 7, laser beams from lasers 702A, 702B, 702C are respectively collimated by collimating lenses 712A, 712B, 712C to produce respective collimated laser beams.

The method 800 continues by adjusting a polarization of the collimated laser beam using a polarization control optics, as in 804. As shown in the example of FIG. 1 and FIG. 2, laser beam from 104 from laser 102 is polarized by polarizer 106 to produce polarized laser beam 108. As shown in the example of FIG. 3, laser beam 308 from laser 304 is polarized by polarizer 306 to produce polarized laser beam 308. As shown in the examples of FIGS. 4 and 5, laser beam 404 from laser 402 is polarized by polarizer 406 to produce polarized laser beam 408. As shown in the example of FIG. 6, laser beam 604 from laser 602 is polarized by polarizer 606 to produce polarized laser beam 608. As shown in the example of FIG. 7, laser beams from lasers 702A, 702B, 702C are respectively polarized by polarizer 706A, 706B, 706C to produce respective polarized laser beams.

The method 800 continues by directing the collimated laser beam that is polarized by a first optical system to illuminate a focal area on a sample surface, as in 806. As shown in the example of FIG. 1 and FIG. 2, the first optical system comprises first resonant scanner 110, focusing lens 112, second resonant scanner 118, first mirror 126, and first one-dimensional parabolic mirror 128 that focuses the laser beam to target area 130 of the nanoscale structure 132 being inspected. As shown in the example of FIG. 3, the first optical system comprises first resonant scanner 310, second resonant scanner 318, and first acylindrical lens 326 that focuses the laser beam to target area 328 of nanoscale structure 330 being inspected. As shown in the examples of FIGS. 4 and 5, the first optical system comprises pattern structure 410, resonant scanner 418, first mirror 426, and first one-dimensional parabolic mirror 428 that focuses the laser beam to target area 430 of nanoscale structure 432 being inspected. As shown in the example of FIG. 6, the first optical system comprises pattern structure 610, resonant scanner 618, and first acylindrical lens 626 that focuses the laser beam to target area 628 of nanoscale structure 630 being inspected. As shown in the example of FIG. 7, the first optical system comprises resonant scanners 710A, 710B, 710C, first set of flat mirrors 714A, 714B, 714C and 716A, 716B, 716C, and first parabolic mirrors 718A, 718B, 718C that focuses the laser beam to respective target areas of the nanoscale structure being inspected.

In some examples, the first optical system results in a two dimensional focus at the sample surface. In some examples, the first optical system results in a one-dimensional focus at the sample surface. In some examples, the first optical system includes a mechanical element or an optical element to dynamically vary an angle of incidence of the illumination forming the focus at the sample surface. In some examples, the first optical system comprises a first resonant scanner, a second resonant scanner, a patterned grating that creates multiple laser beams from the laser beam emitted by the laser source, and a one-dimensional parabolic mirror. In some examples, the first optical system can comprise a resonant scanner, a patterned grating that creates multiple laser beams from the laser beam, and a one-dimensional parabolic mirror. In some examples, the first optical system comprises a plurality of resonant scanners and a plurality of one-dimensional parabolic mirrors, wherein each resonant scanner of the plurality of resonant scanners is associated with a one-dimensional parabolic mirror of the plurality of parabolic mirrors.

The method 800 continues by receiving reflected light from the focus of the laser light source at the sample surface by a second optical system, as in 808. In some examples, the second optical system can include additional polarization control optics, which turns the measurement from reflectivity to ellipsometry. As shown in the example of FIG. 1 and FIG. 2, the second optical system comprises second one-dimensional parabolic mirror 134, second mirror 136, and second focusing lens 138 that receives the reflected light from the target area 130 of the nanoscale structure 132 being inspected. As shown in the example of FIG. 3, the second optical system comprises second acylindrical lens 332 and second focusing lens 334 that receives the reflected light from the target area 328 of nanoscale structure 330 being inspected. As shown in the examples of FIGS. 4 and 5, the second optical system comprises second one-dimensional parabolic mirror 434, second mirror 436, and second focusing lens 438 that receives the reflected light from the laser beam from target area 430 of nanoscale structure 432 being inspected. As shown in the example of FIG. 6, the second optical system comprises second acylindrical lens 632 and second focusing lens 634 that receives the reflected light from the laser beam from target area 628 of nanoscale structure 630 being inspected. As shown in the example of FIG. 7, the second optical system comprises second parabolic mirrors 724A, 724B, 724C, second flat mirrors 726A, 726B, 726C and 728A, 728B, 728C, and second focusing element 730A, 730B, 730C that receives the reflected light from the laser beam from the respective target areas of the nanoscale structure being inspected.

The method 800 continues by detecting the reflected light by a detector system to produce detection signals, as in 810.

As shown in the example of FIG. 1 and FIG. 2, detector 140 receives and detects the reflected light from target area 130 of the nanoscale structure 132 being inspected. As shown in the example of FIG. 3, detector 336 receives and detects the reflected light from target area 328 of nanoscale structure 330 being inspected. As shown in the examples of FIGS. 4 and 5, detector 440, 442, 440 receive and detect the reflected light from target area 430 of nanoscale structure 432 being inspected. As shown in the example of FIG. 6, detector 636, 638, 640 receive and detect the reflected light from target area 628 of nanoscale structure 630 being inspected. As shown in the example of FIG. 7, detectors 730A, 730B, 730C receive and detect reflected light from respective target areas of the nanoscale structure being inspected.

The method 800 continues by processing the detection signals to measure parameters of the sample surface, as in 812. The processing the detection signals can comprise averaging the detection signals from multiple repetitions of mechanical motion. The detection system records the reflectivity of the sample surface as a function of the angle of incidence and the processing system, such as the computer of FIG. 9, interprets the recorded angular spectrum to monitor the status of the sample.

In some examples, the method 800 can include translating the first optical system and the second optical system across the sample surface to cover additional regions of the sample surface, as in 814.

In some examples, the method 800 can include projecting a one-dimensional focal image of the laser light source onto the sample surface with a dynamically variable angle of incidence by using two resonant scanners and one or more one-dimensional parabolic mirrors, as in 816. In this example, each of the two resonant scanners is a galvanometric mirror scanner and the laser beam is scanned in first dimension using a first resonant scanner and scanned in a second dimension using a second resonant scanner.

In some examples, the method 800 can include projecting a one-dimensional focal image of the laser light source onto the sample surface with a dynamically variable angle of incidence in a direction perpendicular to a one-dimensional image of the laser light source by using two resonant scanners and one or more acylindrical lenses, as in 818. In this example, the one resonant scanner can be a galvanometric mirror scanner.

In some examples, the method 800 can include creating a one-dimensional focal image of the laser light source using a grating to create multiple diffraction orders along a line; and using a resonant scanner and parabolic mirrors to dynamically vary angles of incidence and collection of a foci of a multiplicity of diffraction orders onto the sample surface, as in 820. In this example, the resonant scanner can be a galvanometric mirror scanner.

In some examples, the method 800 can include creating a one-dimensional focal image of the laser light source using a grating to create multiple diffraction orders along a line; and using a resonant scanner and acylindrical lenses to dynamically vary angles of incidence and collection of a multiplicity of diffraction orders onto the sample surface, as in 822.

In some examples, the method 800 can include creating a one-dimensional focal image of the laser light source using an optical system to expand the laser beam from the laser light source in one direction, and using a resonant scanner along with parabolic mirrors to dynamically vary angles of incidence and collection of the illumination forming the focus of the laser beam that is expanded from the laser light source onto the sample surface, as in 824.

In some examples, the method 800 can include creating a one-dimensional focal image of the laser light source using an optical system to expand the laser beam from the laser light source in one direction, and using a resonant scanner along with acylindrical mirrors to dynamically vary angles of incidence and collection of the illumination forming the focus of the laser beam that is expanded from the laser light source onto the sample surface, as in 826.

In some examples, the method 800 can include projecting a multiplicity of focal images of the laser light source onto the sample surface with a dynamically variable angle of incidence by using a multiple leg optical system with a resonant scanner and a pair of parabolic mirrors for each leg of the multiple leg optical system, as in 828. Each leg of the multiple leg optical system can be rotated on an axis perpendicular to a direction of sample surface motion to allow for conical diffraction measurements.

In some examples, the method 800 can include recording the detection signals, as in 830. The detector system can comprise a single detector or a number of independent detectors that match a number of multiple laser beams.

In some examples, the method 800 can include using a multiplicity of laser sources at different wavelengths with outputs optically combined in a single beam and a corresponding multiplicity of detectors responsive to each wavelength to provide wavelength diversity.

In some examples, the method 800 can include additional polarization optics to allow ellipsometric measurements.

Figure 9:
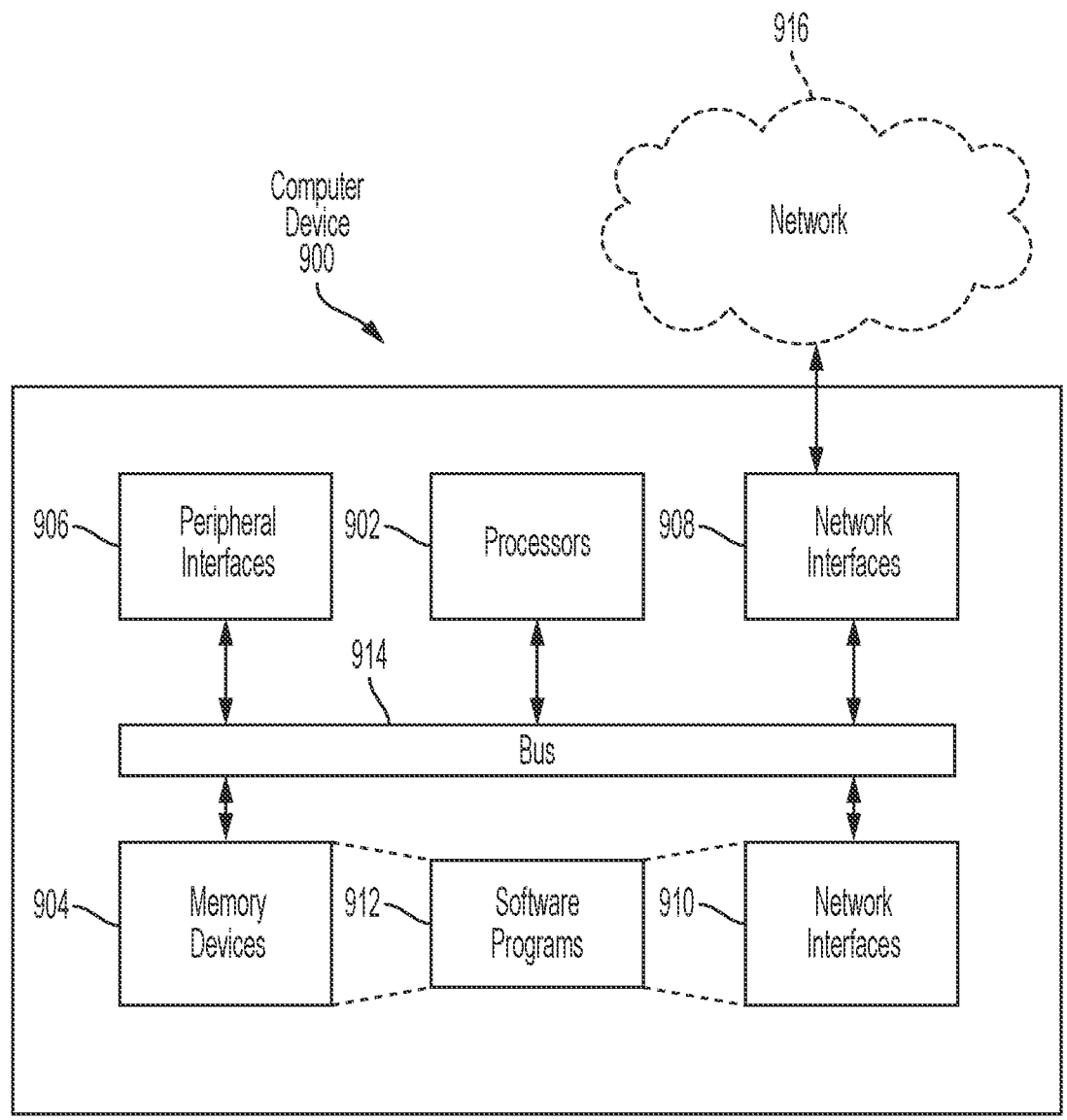
FIG. 9 shows a block diagram of the electronic system for a multipoint scatterometer in accordance with the present teachings.

The detectors of FIGS. 1-7 can be wired or wirelessly coupled to a computer device for processing the detected signal. FIG. 9 is an example of a hardware configuration for computer device 900, which can be used to perform one or more of the processes described above. Computer device 900 can be any type of computer devices, such as desktops, laptops, servers, etc., or mobile devices, such as smart telephones, tablet computers, cellular telephones, personal digital assistants, etc. As illustrated in FIG. 9, computer device 900 can include one or more processors 902 of varying core configurations and clock frequencies. Computer device 900 can also include one or more memory devices 904 that serve as a main memory during the operation of computer device 900. For example, during operation, a copy of the software that supports the above-described operations can be stored in one or more memory devices 904. Computer device 900 can also include one or more peripheral interfaces 906, such as keyboards, mice, touchpads, computer screens, touchscreens, etc., for enabling human interaction with and manipulation of computer device 900. Computer device 900 can also include bus 914, such as a data bus, that allows one or more components of the computer device 900 to communicate with each other.

The computer device 900 can also include one or more network interfaces 908 for communicating via one or more networks, such as Ethernet adapters, wireless transceivers, or serial network components, for communicating over wired or wireless media using protocols. Computer device 900 can also include one or more storage devices 910 of varying physical dimensions and storage capacities, such as flash drives, hard drives, random access memory, etc., for storing data, such as images, files, and program instructions for execution by one or more processors 902.

Additionally, computer device 900 can include one or more software programs 912 that enable the functionality described above. One or more software programs 912 can include instructions that cause one or more processors 902 to perform the processes, functions, and operations described herein, for example, with respect to the processes of FIG. 8. Copies of one or more software programs 912 can be stored in one or more memory devices 904 and/or on in one or more storage devices 910. Likewise, the data utilized by one or more software programs 912 can be stored in one or more memory devices 904 and/or on in one or more storage devices 910.

In implementations, computer device 900 can communicate with other devices via network 914. The other devices can be any types of devices as described above. Network 914 can be any type of network, such as a local area network, a wide-area network, a virtual private network, the Internet, an intranet, an extranet, a public switched telephone network, an infrared network, a wireless network, and any combination thereof. Network 914 can support communications using any of a variety of commercially-available protocols, such as TCP/IP, UDP, OSI, FTP, UPnP, NFS, CIFS, AppleTalk, and the like. Network 914 can be, for example, a local area network, a wide-area network, a virtual private network, the Internet, an intranet, an extranet, a public switched telephone network, an infrared network, a wireless network, and any combination thereof.

Computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of computer device 900 as described above need not be enclosed within a single enclosure or even located in close proximity to one another. Those skilled in the art will appreciate that the above-described componentry are examples only, as computer device 900 can include any type of hardware componentry, including any necessary accompanying firmware or software, for performing the disclosed implementations. Computer device 900 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with examples of the present disclosure disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for high-speed 2θ multi-point scatterometry comprising:
    collimating a laser beam from a laser light source;
    adjusting a polarization of the collimated laser beam using a polarization control optics;
    illuminating a multiplicity of focal areas along a line on a sample surface, wherein angles of incidence of illumination of each of the multiplicity of focal areas are dynamically varied in a direction perpendicular to the line of the focal areas by a first optical system;
    receiving light reflected at the dynamically varied angles of incidence of the illumination from the multiplicity of focal areas at the sample surface by a second optical system;
    detecting the reflected light at the dynamically varied angles of incidence of the illumination from the multiplicity of focal areas by a detector system to produce detection signals; and
    recording and processing the detection signals to measure parameters of the sample surface.

2. The method of claim 1, further comprising translating the first optical system and the second optical system across the sample surface to cover additional regions of the sample surface.

3. The method of claim 1, wherein additional polarization control optics are included in the second optical system.

4. The method of claim 1, wherein the laser light source is composed of multiple individual lasers at different wavelengths with the beams from each laser optically combined into a single beam and wherein the detection system is configured to separately record the detection signals at the different wavelengths.

5. The method of claim 1, wherein the first optical system comprises a first resonant scanner with a first rotation axis to provide dynamical variation of the angles of incidence of the illumination of multiple focal areas of the sample surface.

6. The method of claim 5, wherein the first optical system comprises a second resonant scanner with a second rotation axis oriented in a perpendicular direction to the first rotation axis of the first resonant scanner to provide the multiplicity of focal areas of illumination of the sample surface.

7. The method of claim 5, wherein the first optical system comprises a diffraction grating to provide the multiplicity of focal areas of illumination of the sample surface wherein diffracted orders from the diffraction grating are aligned along the rotation axis of the first resonant scanner.

8. The method of claim 7, wherein the detector system comprises a number of independent detectors that match a number of multiple laser beams.

9. The method of claim 5, wherein the first optical system comprises optics to expand the collimated beam in one direction along the rotation axis of the first resonant scanner.

10. The method of claim 5, wherein the sample surface is patterned with a 1D grating and the first optical system is adjusted so that the line between the multiplicity of focal areas is parallel to the lines of the grating.

11. The method of claim 10, wherein the first optical system and the second optical systems are rotated on an axis normal to the sample surface to allow for conical diffraction measurements.

12. The method of claim 1, wherein the first optical system comprises a first one-dimensional parabolic mirror and the second optical system comprises a second one-dimensional parabolic mirror.

13. The method of claim 1, wherein the first optical system comprises a first acylindrical lens and the second optical system comprises a second acylindrical lens.

14. The method of claim 1, wherein the laser light source is a single laser.

15. A system for high-speed 2θ multi-point scatterometry comprising:
a multiplicity of modules, each module comprising:
a first optical system comprising one or more first optical elements that are configured to illuminate a focal area of a sample surface with a polarized laser beam, wherein an angle of incidence of illumination is dynamically varied by a first optical system;
a second optical system comprising one or more second optical elements that are configured receiving light reflected at the dynamically varied angles of incidence of the illumination from the sample surface;
a detector system configured to detect the reflected light at the dynamically varied angles of incidence of the illumination from a multiplicity of focal areas and to produce detection signals; and
a processing system comprising a hardware processor that is configured to process the detection signals from each module to measure parameters of the sample surface,
wherein each focal area of the sample surface that is illuminated by the first optical system is separated on the sample surface.

16. The system of claim 15, wherein each module includes a laser source along with collimation and polarization optics.

17. The system of claim 15, wherein a single laser source, collimation optics, polarization optics and beam-splitting optics are provided to deliver a collimated polarized laser beam to each module.

* * * * *